(12) United States Patent
Sugiyama et al.

(10) Patent No.: US 6,631,065 B2
(45) Date of Patent: Oct. 7, 2003

(54) OVERCURRENT INTERRUPTING DEVICE

(75) Inventors: Kazuto Sugiyama, Shizuoka (JP); Keiichi Ito, Aichi (JP); Kazuyuki Shiraki, Aichi (JP); Isao Yoneyama, Aichi (JP)

(73) Assignees: Yazaki Corporation, Tokyo (JP); Toyota Jidosha Kabushiki Kaisha, Aichi (JP)

( * ) Notice: Subject to any disclaimer, the term of this patent is extended or adjusted under 35 U.S.C. 154(b) by 112 days.

(21) Appl. No.: 09/883,171

(22) Filed: Jun. 19, 2001

(65) Prior Publication Data

US 2002/0014943 A1 Feb. 7, 2002

(30) Foreign Application Priority Data

Jun. 19, 2000 (JP) ........................................ 2000-183341

(51) Int. Cl.[7] .................................................. H02H 3/00
(52) U.S. Cl. ...................... 361/100; 361/93.1; 361/115
(58) Field of Search .......................... 361/93.1, 58, 115, 361/62, 64, 66, 100

(56) References Cited

U.S. PATENT DOCUMENTS

| | | | | |
|---|---|---|---|---|
| 5,241,444 A | * | 8/1993 | Yeh | 361/59 |
| 5,272,585 A | * | 12/1993 | Gibbs | 361/64 |
| 5,926,010 A | * | 7/1999 | Hosokawa et al. | 323/222 |

FOREIGN PATENT DOCUMENTS

| | | | |
|---|---|---|---|
| JP | 10-59090 | 3/1998 | B60R/16/02 |
| JP | 10-271698 | 10/1998 | H02J/7/00 |

OTHER PUBLICATIONS

Abstract JP10271698, Oct. 9, 1998.
Abstract JP10059090, Mar. 3, 1998.

* cited by examiner

*Primary Examiner*—Stephen W. Jackson
(74) *Attorney, Agent, or Firm*—Sughrue Mion, PLLC

(57) ABSTRACT

An overcurrent interrupting device includes a power MOSFET (10) for controlling an electric current flowing from a power supply to a load; a current detection circuit (30) for detecting a current value of an electric current flowing from the power MOSFET (10) to a load (L); a determination value selection circuit (50) for selecting a determination value used for determining an overcurrent; an overcurrent determination circuit (40) for determining whether or not the current value represents occurrence of an overcurrent, on the basis of the current value detected by the current detection circuit (30) and the determination value selected by the determination value selection circuit (50); and a boosting and switching circuit (20) for controlling activation/deactivation of the power MOSFET (10) on the basis of a result of determination rendered by the overcurrent determination circuit (40).

5 Claims, 4 Drawing Sheets

FIG. 2

| PATTERN | SW1 | SW2 | DETERMINATION VALUE |
|---|---|---|---|
| (1) | OFF | OFF | 7.5A |
| (2) | OFF | ON | 10A |
| (3) | ON | OFF | 15A |
| (4) | ON | ON | 20A |

OVERCURRENT INTERRUPTING DEVICE

BACKGROUND OF THE INVENTION

1. Technical Field of the Invention

The present invention relates to an overcurrent interrupting device for interrupting a current when an overcurrent flows into electric circuits mounted on equipment on vehicles, ships, or airplanes.

2. Related Art

Generally, an overcurrent interrupting device, which is installed on an automobile and interrupts an electric current flowing to a load when the electric current is an overcurrent, is known. An intelligent power switch (IPS) having an overcurrent breaking function of interrupting an overcurrent is commercially practical as such an overcurrent interrupting device. The IPS is employed and housed in a junction box as an alternative to a related-art fuse or relay.

Since the IPS has an overcurrent breaking function, the IPS finds a wide range of applications. For example, Japanese Patent publication No. Hei. 10-59090 describes a "Vehicle Power Distribution Device" using such an IPS. The vehicle power distribution device detects an overcurrent, an overvoltage, an excessive temperature rise, etc, thereby deactivating an output transistor and interrupting an electric current.

Japanese Patent Publication No. Hei 10-271698 describes a "Vehicle Feeder System" using the IPS. This vehicle feeder system detects an overcurrent, an overvoltage, an excessive temperature rise, etc, thereby interrupting power output from an output circuit.

FIG. 4 shows the general configuration of a related-art overcurrent interrupting device using such an IPS. The overcurrent interrupting device is interposed between a power supply (12V) and a load L. A load switch SW for supplying power to the load L is switched to an ON position, thereby activating the overcurrent interrupting device. An IPS 101 comprises a power MOSFET 110, a boosting and switching circuit 120, a current detection circuit 130, and an overcurrent determination circuit 140.

The power MOSFET 110 is a bulk power transistor. The drain D of the power MOSFET 110 is connected to a power supply (+12V). The source S of the power MOSFET 110 is connected to the load L via the current detection circuit 130, and the gate G of the power MOSFET 110 is connected to the boosting and switching circuit 120.

When the load switch SW is turned on, the boosting and switching circuit 120 outputs a pulse signal which is turned on/off at a predetermined duty cycle. The pulse signal generated by the boosting and switching circuit 120 is supplied as a gate signal to the gate G of the power MOSFET 110.

The current detection circuit 130 detects the magnitude of an electric current flowing from the source S of the power MOSFET 110 to the load L, and outputs the result of detection as a current value. The current value output from the current detection circuit 130 is supplied to the overcurrent determination circuit 140. The overcurrent determination circuit 140 compares the current value output from the current detection circuit 130 with a predetermined value stored beforehand in the overcurrent determination circuit 140. If the current value output from the current detection circuit 130 is greater than the determination value, an overcurrent detection signal to this effect is supplied to the boosting and switching circuit 120.

The operation of the related-art overcurrent interrupting device having the foregoing configuration will now be described. When the load switch SW is in an OFF state, the boosting and switching circuit 120 outputs a low-level signal (hereinafter called an "L-level signal") Accordingly, the power MOSFET 110 is held in an OFF state, and no current flows to the load L. When the load switch SW is turned on in this state, the boosting and switching circuit 120 outputs a pulse signal and supplies the signal to the gate G of the power MOSFET 110 as a gate signal. As a result, the power MOSFET 110 is turned on/off in accordance with the gate signal, thereby intermittently supplying an electric current to the load L.

The current detection circuit 130 detects the magnitude of an electric current flowing from the power supply to the load L via the power MOSFET 110 at all the time, and supplies the result of detection to the overcurrent determination circuit 140. The overcurrent determination circuit 140 compares the current value output from the current detection circuit 130 with the predetermined value stored in the overcurrent determination circuit 140. When the current value detected by the current detection circuit 130 is greater than the determination value, an overcurrent detection signal to this effect is supplied to the boosting and switching circuit 120. The boosting and switching circuit 120 suspends an output of a pulse signal and outputs a low-level signal. Consequently, the power MOSFET 110 enters an OFF state, thereby interrupting an electric current flowing to the load L.

As mentioned above, the IPS 101 used in the related-art overcurrent interrupting device compares the current value detected by the current detection circuit 130 with the determination value stored in the overcurrent determination circuit 140, thereby determining whether or not the detected current is an overcurrent.

Whether the detected current is an overcurrent is determined depending on the basis of a load. The determination value stored in the overcurrent determination circuit 140 of the IPS is only a fixed value. Hence, an IPS of one type cannot be shared among a plurality of types of loads, and hence it is necessary to use the several types of IPSs each having suitable determination value for each load. Consequently, in relation to a vehicle equipped with a plurality of types of loads, the number of types of overcurrent interrupting devices to be used is increased. This also results in an increase in the number of types of electronic control units (ECUs) equipped with overcurrent interrupting devices.

SUMMARY OF THE INVENTION

The present invention has been conceived to solve such a problem and is aimed at providing an overcurrent interrupting device which can be shared among a plurality of types of loads.

To achieve the object, the present invention provides, according to the first aspect of the invention, an overcurrent interrupting device comprising:

a semiconductor switch which controls an electric current flowing from a power supply to a load;

a current detection circuit which detects a current value of an electric current flowing from the semiconductor switch to the load;

a determination value selection circuit which selects a determination value for determining a overcurrent;

an overcurrent determination circuit which determines whether or not the current flowing from the semiconductor switch to the load is an overcurrent, on the basis of the current value and the determination value selected by the determination value selection circuit, and outputs a result of the determination; and a control circuit which controls the semiconductor switch on the basis of the result of the determination.

According to the first aspect, a determination value selection circuit enables selection of a determination value used for determining occurrence of an overcurrent. Accordingly, there can be provided an overcurrent interrupting device capable of being shared among loads of different types which enable flow of different currents. Consequently, the general versatility of the overcurrent interrupting device is improved, thereby diminishing the number of types of ECUs equipped with the overcurrent interrupting device.

According to a second aspect of the invention, in the overcurrent interrupting device of the first aspect, a plurality of switches are connected to the determination value selection circuit, and the determination value selection circuit selects the determination value in accordance with a setting state of the plurality of switches.

According to the second aspect, a plurality of switches are set in accordance with an electric current which can be caused to flow through a load. A determination value compliant with a load is selected by means of a determination value selection circuit. Hence, there can be provided an overcurrent interrupting device having superior versatility despite having a simple structure.

According to a third aspect of the invention, in the overcurrent interrupting device of the first aspect, a CPU is connected to the determination value selection circuit, and the determination value selection circuit selects the determination value in accordance with a signal output from the CPU.

According to the third aspect, a CPU supplies a predetermined signal to a determination value selection circuit in accordance with an electric current which can be caused to flow through a load. A determination value compliant with the load is selected. Hence, an overcurrent interrupting device having superior versatility can be provided. In this case, the CPU can double as a CPU provided on equipment to which the overcurrent interrupting device is applied. By means of such a configuration of the overcurrent interrupting device, the configuration of the overcurrent interrupting device can be simplified much further.

To achieve the object, the present invention provides, according to a fourth aspect of the invention, a interrupting device comprising:

a semiconductor switch which controls an electric current flowing from a power supply to a load;

a detector which detects a condition of the load;

a determination value selection circuit which selects a determination value for determining an abnormal condition of the load;

a determination circuit which determines whether or not the load is in the abnormal condition on the basis of the condition of the load and the determination value selected by the determination value selection circuit, and outputs a result of the determination; and a control circuit which controls the semiconductor switch on the basis of the result of the determination.

According to the fourth aspect, a determination value selection circuit enables selection of a determination value used for determining occurrence of abnormal condition of the load. Accordingly, there can be provided an interrupting device capable of being shared among loads of different types which enable flow of different currents. Consequently, the general versatility of the interrupting device is improved, thereby diminishing the number of types of ECUs equipped with the interrupting device.

According to a fifth aspect of the invention, in the interrupting device of the fourth aspect, the condition of the load includes one of a current condition, a voltage condition and a temperature condition of the load, and the abnormal condition includes one of an overcurrent condition, an overvoltage condition and an excessive temperature rise condition.

According to a sixth aspect of the invention, in the interrupting device of the fourth aspect, a plurality of switches are connected to the determination value selection circuit, and the determination value selection circuit selects the determination value in accordance with a setting state of the plurality of switches.

According to a seventh aspect of the invention, in the interrupting device of the fourth aspect, a CPU is connected to the determination value selection circuit, and the determination value selection circuit selects the determination value in accordance with a signal output from the CPU.

BRIEF DESCRIPTION OF THE DRAWINGS

FIG. 2 is a table for describing the relationship between setting patterns of switches SW1 and SW2 of the overcurrent interrupting device shown in FIG. 1 and determination values;

DETAILED DESCRIPTION OF PREFERRED EMBODIMENT

Figure 1:
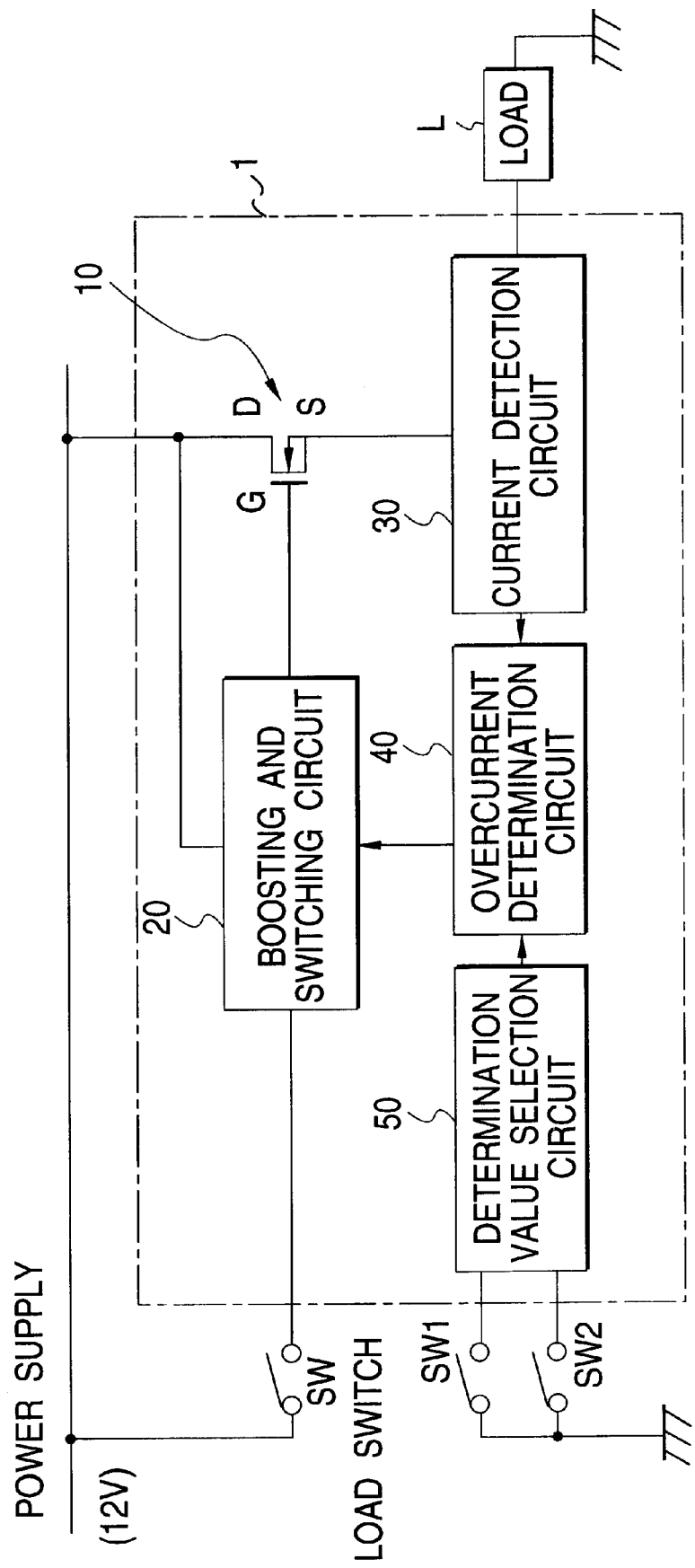
FIG. 1 is a block diagram showing the configuration of an overcurrent interrupting device according to a first embodiment of the present invention.

Overcurrent interrupting devices according to embodiments of the present invention will be described in detail by reference to the accompanying drawings. Throughout the embodiments, elements which are identical with or correspond to those described in connection with the background art will be assigned the same reference numerals.

First Embodiment

FIG. 1 is a block diagram showing the configuration of an overcurrent interrupting device according to a first embodiment of the present invention. The overcurrent interrupting device is interposed between the power supply (12V) and the load L and is activated as a result of activation of a load switch SW for supplying power to the load L.

The overcurrent interrupting device is constituted of an IPS 1 and switches SW1 and SW2. The IPS 1 is constituted of a power MOSFET 10, a boosting and switching circuit 20, a current detection circuit 30, an overcurrent determination circuit 40, and a determination value selection circuit 50.

The power MOSFET 10 corresponds to a semiconductor switch according to the present invention. The power MOSFET 10 is a bulk-power transistor and controls power to be supplied to the load L. The drain D of the power MOSFET 10 is connected to the power supply (+12V), and the source S of the power MOSFET 10 is connected to the load L via a current detection circuit 30. The gate G of the power MOSFET 10 is connected to the boosting and switching circuit 20. A semiconductor switch employed in the present invention is not limited to a power MOSFET and maybe embodied in an insulated gate bipolar transistor (IGBT) or another power device.

The boosting and switching circuit 20 includes a boosting circuit for ensuring a gate voltage at which the power MOSFET 10 is caused to operate in a resistor region, and a switching circuit for producing a pulse signal. An output terminal of the boosting and switching circuit 20 is connected to the gate G of the power MOSFET 10. Further, the load switch SW and the overcurrent determination circuit 40 are connected to the boosting and switching circuit 20.

The load switch SW is for starting activating the boosting and switching circuit 20 and is used for supplying an electric current to the load L. One end of the load switch SW is connected to the boosting and switching circuit 20, and the other end of the load switch SW is connected to the power supply (12V). The load switch SW is turned on, thereby supplying a supply voltage to the boosting and switching circuit 20.

When the load switch SW is in an OFF state, the boosting and switching circuit 20 outputs an L-level signal. As a result of the load switch SW being turned on from OFF state, the boosting and switching circuit 20 outputs a pulse signal which has a predetermined voltage level and is turned on/off at a predetermined duty cycle. The signal output from the boosting and switching circuit 20 is supplied as a gate signal to the gate G of the power MOSFET 10.

When receiving an overcurrent detection signal (to be described in detail later) from the overcurrent determination circuit 40, the boosting and switching circuit 20 stops output of the pulse signal, thereby outputting an L-level signal.

The current detection circuit 30 detects the magnitude of an electric current flowing through the load L from the source S of the power MOSFET 10 and outputs the result of detection as a current value. The current value output from the current detection circuit 30 is supplied to the overcurrent determination circuit 40.

The overcurrent detection circuit 40 compares the current value output from the current detection circuit 30 with a determination value output from the determination value selection circuit 50. If the current value output from the current detection circuit 30 is greater than the determination value output from the determination value selection circuit 50, an overcurrent detection signal to this effect is supplied to the boosting and switching circuit 20.

The two switches SW1 and SW2 are connected to the determination value selection circuit 50. The determination value selection circuit 50 generates a determination value according to a setting state (i.e., a setting pattern) of the switches SW1 and SW2. The relationship between the setting pattern of the switches SW1 and SW2 and the determination value is shown in FIG. 2.

As shown in FIG. 2, in the case of pattern (1), when the switches SW1 and SW2 are both in an OFF state, a value of 7.5A is output as a determination value. In the case of pattern (2), when the switch SW1 is in an OFF state and the switch SW2 is in an ON state, a value of 10A is output as a determination value. In the case of pattern (3), when the switch SW1 is in an ON state and the switch SW2 is in an OFF state, a value of 15A is output as a determination value. In the case of pattern (4), when the switches SW1 and SW2 are both in an ON state, a value of 20A is output as a determination value. A determination value output from the determination value selection circuit 50 is supplied to the overcurrent determination circuit 40.

The operation of the overcurrent interrupting device having the foregoing configuration according to the first embodiment will now be described.

A user sets switches SW1 and SW2 to any one of the patterns (1) through (4) shown in FIG. 2 according to the type of the load L. As a result, the determination value selection circuit 50 outputs a determination value corresponding to the set pattern.

In a state in which the load switch SW is in an OFF state, the boosting and switching circuit 20 outputs an L-level signal. Accordingly, the power MOSFET 10 remains in an OFF state, and no current flows to the load L.

When the load switch SW is turned on from this state, the boosting and switching circuit 20 outputs a pulse signal of predetermined voltage level, which signal is turned on/off at a predetermined duty cycle. The pulse signal is supplied to a gate G of the power MOSFET 10 as a gate signal. The power MOSFET 10 is turned on/off in accordance with the gate signal, and a current output from the power supply is intermittently supplied to the load L. Consequently, for example, when the load L is a headlamp, the headlamp is illuminated.

Concurrently with the foregoing operation, the current detection circuit 30 detects, at all times, the magnitude of an electric current flowing through the load L from the power supply via the power MOSFET 10. The current value detected by the current detection circuit 30 is supplied to the overcurrent determination circuit 40. The overcurrent determination circuit 40 compares the current value output from the current detection circuit 30 with the determination value output from the determination value selection circuit 50. If the current value output from the current detection circuit 30 is greater than the determination value output from the determination value selection circuit 50, the overcurrent determination circuit 40 recognizes the flow of overcurrent and supplies an overcurrent detection signal to the boosting and switching circuit 20.

As a result, the boosting and switching circuit 20 stops an output of the pulse signal and outputs an L-level signal. Consequently, the power MOSFET 10 becomes in the OFF state, thereby interrupting the electric current flowing through the load L.

As has been described, in the overcurrent interrupting device according to the first embodiment, a determination value to be used for determining occurrence of an overcurrent can be changed by changing setting patterns of the switches SW1 and SW2.

Accordingly, the number of types of overcurrent interrupting devices employed in, e.g., a vehicle can be reduced. As a result, the number of types of ECUs equipped with an overcurrent interrupting device can be reduced. Further, operations required for arranging an overcurrent interrupting device or controlling a stock of overcurrent interrupting devices can be reduced.

In the foregoing first embodiment, four types of determination values can be set through use of the two switches SW1 and SW2. The number of switches is not limited to two and may be set to an arbitrary number. For instance, if three switches are employed, eight types of determination values can be set.

Second Embodiment

Figure 3:
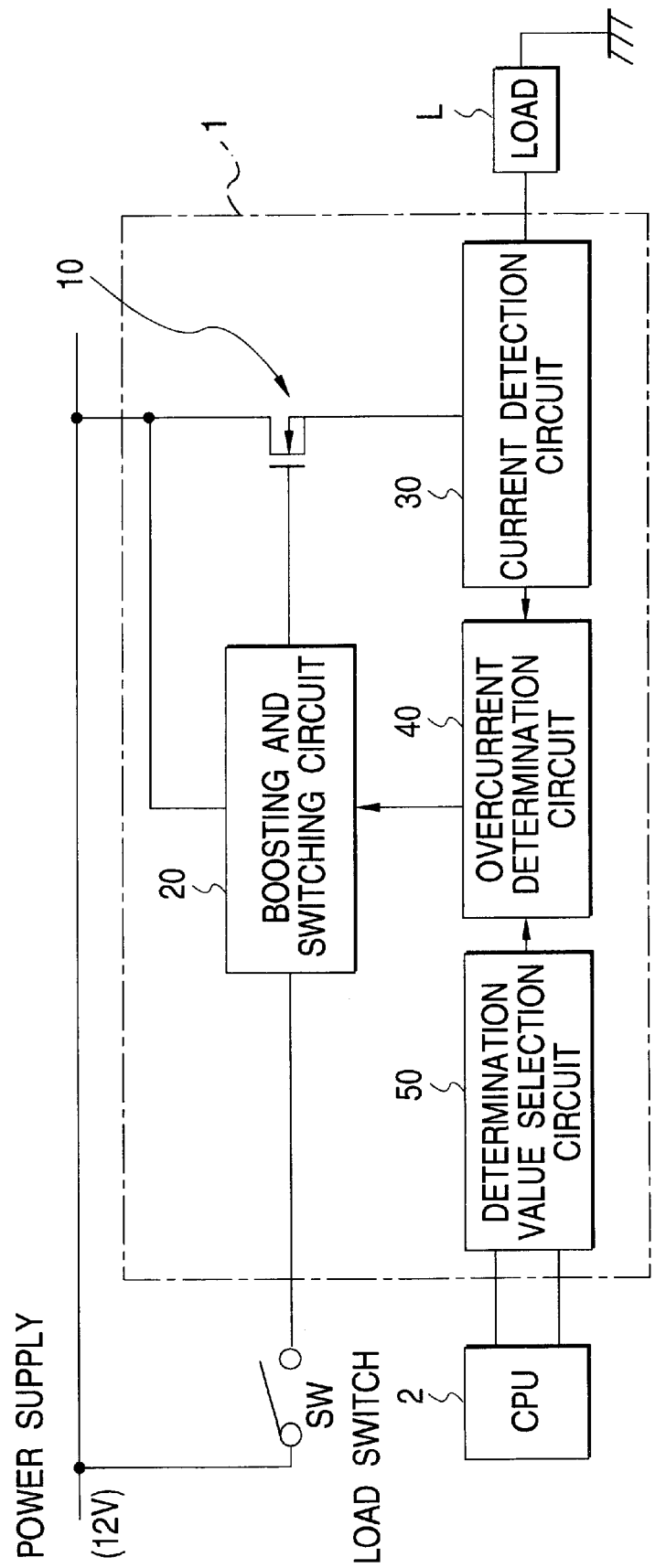
FIG. 3 is a block diagram showing the configuration of an overcurrent interrupting device according to a second embodiment of the present invention.
Figure 4:
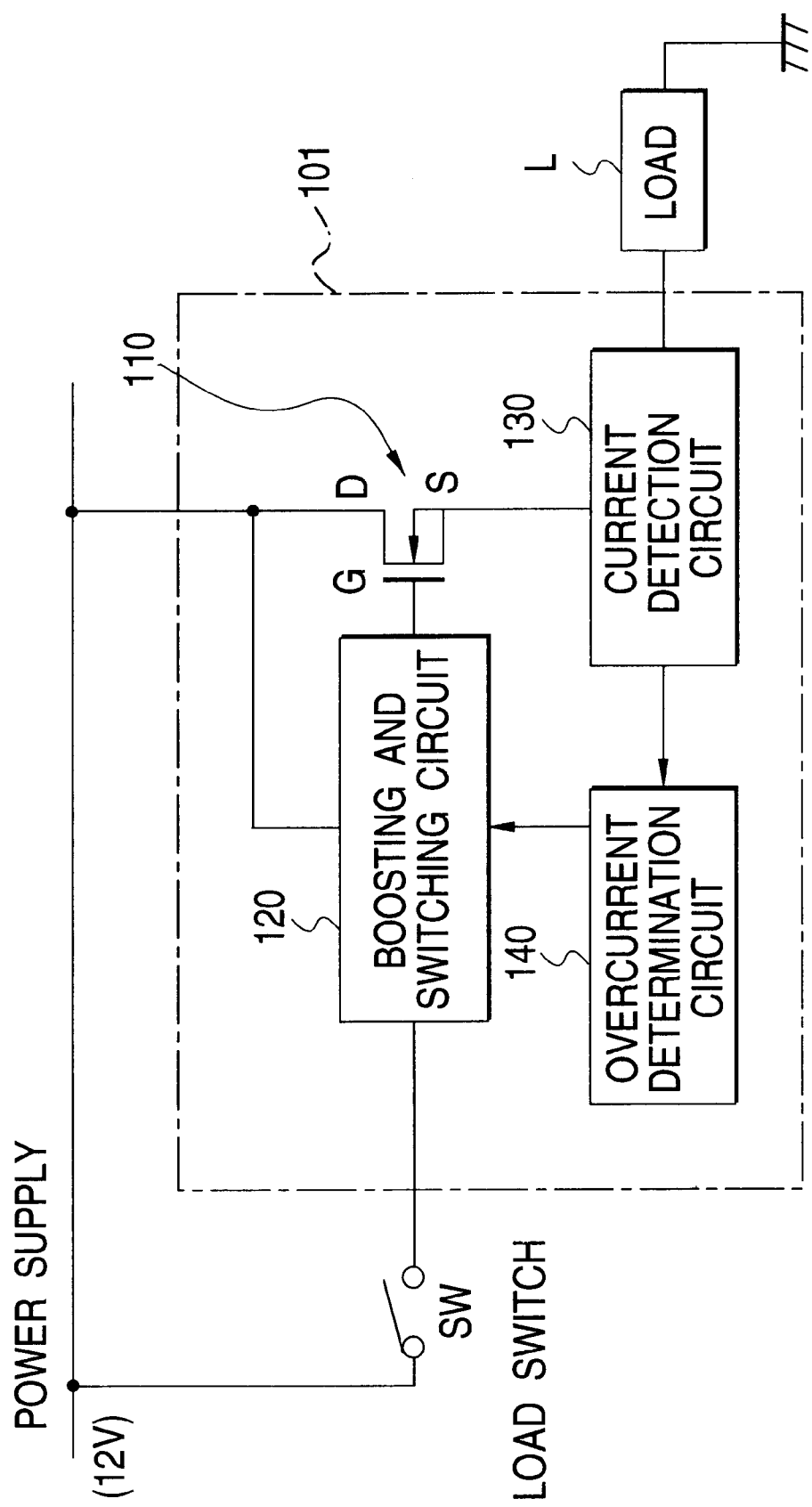
FIG. 4 is a block diagram for describing a related-art overcurrent interrupting device.

FIG. 3 is a block diagram showing the constitution of an overcurrent interrupting device according to a second embodiment of the present invention. The overcurrent interrupting device is constituted by replacing switches SW1 and SW2 of the overcurrent interrupting device according to the first embodiment with a central processing unit (CPU) 2.

A CPU provided in an electronic control unit (ECU) to which the over current interrupting device is applied can be used both as the CPU 2. The CPU 2 supplies to the determination value selection circuit 50 a signal equivalent to that supplied by the switches SW1 and SW2 described in the first embodiment.

The CPU 2 may fixedly determine which of signals corresponding the patterns (1) through (4) shown in FIG. 2 is to he supplied to the determination value selection circuit 50. Alternatively, a determination as to which of the signals is to be supplied may be instructed by way of an unillustrated control section connected to the CPU 2.

The overcurrent interrupting device according to the second embodiment operates in the same manner as the overcurrent interrupting device according to the first embodiment.

As has been described, the overcurrent interrupting device according to the second embodiment can change a determination value under control of the CPU 2. In addition to the advantage yielded by the overcurrent interrupting device according to the first embodiment, the overcurrent interrupting device according to the second embodiment yields an advantage of obviating use of the switches SW1 and SW2, thereby simplifying the construction of the overcurrent interrupting device.

The first and second embodiments have described a case where an overcurrent interrupting device is constituted through use of an IPS. In the event of occurrence of an overvoltage or excessive temperature rise, the overcurrent interrupting device may be constituted so as to turn off the power MOSFET. In this case, as in a case where an overcurrent is interrupted, the overcurrent interrupting device can be constituted so that a determination value for an overvoltage and a determination value for an excessive temperature rise can be set through use of a switch or a CPU. Even in this case, the same working-effect and advantage as those yielded in the first and second embodiments are yielded.

As has been described in detail, according to the present invention, a determination value selection circuit enables selection of a determination value used for determining occurrence of an overcurrent. Accordingly, there can be provided an overcurrent interrupting device capable of being shared among loads of different types which enable flow of different currents. Consequently, the general versatility of the overcurrent interrupting device is improved, thereby diminishing the number of types of ECUs equipped with the overcurrent interrupting device.

According to the present invention, a plurality of switches are set in accordance with an electric current which can be caused to flow through a load. A determination value compliant with a load is selected by a determination value selection circuit. Hence, there can be provided an overcurrent interrupting device having superior versatility despite having a simple structure.

According to the present invention, a CPU supplies a predetermined signal to a determination value selection circuit in accordance with an electric current which can be caused to flow through a load. A determination value compliant with the load is selected. Hence, an overcurrent interrupting device having superior versatility can be provided. In this case, the CPU can be used both as a CPU provided on equipment to which the overcurrent interrupting device is applied. According to such a configuration of the overcurrent interrupting device, the configuration of the overcurrent interrupting device can be simplified much further.

What is claimed is:

1. An overcurrent interrupting device comprising:
a semiconductor switch which controls an electric current flowing from a power supply to a load;
a current detection circuit which detects a current value of an electric current flowing from the semiconductor switch to load;
a determination value selection circuit which selects a determination value for determining an overcurrent;
an overcurrent determination circuit which determines whether or not the current flowing from the semiconductor switch to the load is an overcurrent, on the basis of the current value and the determination value selected by the determination value selection circuit, and outputs a result of the determination; and
a control circuit which controls the semiconductor switch on the basis of the result of the determination;
wherein a plurality of switches are connected to the determination value selection circuit, and the determination value selection circuit selects the determination value in accordance with a setting state of the plurality of switches.

2. An overcurrent interrupting device comprising:
a semiconductor switch which controls an electric current flowing from a power supply to a load;
a current detection circuit which detects a current value of an electric current flowing from the semiconductor switch to the load;
a determination value selection circuit which selects a determination value for determining an overcurrent;
an overcurrent determination circuit which determines whether or not the current flowing from the semiconductor switch to the load is an overcurrent, on the basis of the current value and the determination value selected by the determination value selection circuit, and outputs a result of the determination; and
a control circuit which controls the semiconductor switch on the basis of the result of the determination;
wherein a CPU is connected to the determination value selection circuit, and the determination value selection circuit selects the determination value in accordance with a signal output from the CPU.

3. An overcurrent interrupting device comprising:
a semiconductor switch which controls an electric current flowing from a power supply to a load;
a detector which detects a condition of the load;
a determination value selection circuit which selects a determination value for determining an abnormal condition of the load;
a determination circuit which determines whether or not the load is in the abnormal condition on the basis of the condition of the load and the determination value selected by the determination value selection circuit, and outputs a result of the determination; and
a control circuit which controls the semiconductor switch on the basis of the result of the determination;
wherein the condition of the load includes one of a current condition, a voltage condition and a temperature condition of the load, and the abnormal condition includes one of an overcurrent condition, an overvoltage condition and an excessive temperature rise condition.

4. An overcurrent interrupting device comprising:

a semiconductor switch which controls an electric current flowing from a power supply to a load;

a detector which detects a condition of the load;

a determination value selection circuit which selects a determination value for determining an abnormal condition of the load;

a determination circuit which determines whether or not the load is in the abnormal condition on the basis of the condition of the load and the determination value selected by the determination value selection circuit, and outputs a result of the determination; and a control circuit which controls the semiconductor switch on the basis of the result of the determination;

wherein a plurality of switches are connected to the determination value selection circuit, and the determination value selection circuit selects the determination value in accordance with a setting state of the plurality of switches.

5. An overcurrent interrupting device comprising:

a semiconductor switch which controls an electric current flowing from a power supply to a load;

a detector which detects a condition of the load;

a determination value selection circuit which selects a determination value for determining an abnormal condition of the load;

a determination circuit which determines whether or not the load is in the abnormal condition on the basis of the condition of the load and the determination value selected by the determination value selection circuit, and outputs a result of the determination; and a control circuit which controls the semiconductor switch on the basis of the result of the determination;

wherein a CPU is connected to the determination value selection circuit, and the determination value selection circuit selects the determination value in accordance with a signal output from the CPU.

* * * * *